United States Patent
Qi

(10) Patent No.: US 12,081,615 B2
(45) Date of Patent: Sep. 3, 2024

(54) APPLICATION SHARING METHOD, ELECTRONIC DEVICE AND COMPUTER-READABLE STORAGE MEDIUM

(71) Applicant: VIVO MOBILE COMMUNICATION CO., LTD., Guangdong (CN)

(72) Inventor: Shuangcheng Qi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 14 days.

(21) Appl. No.: 17/824,184

(22) Filed: May 25, 2022

(65) Prior Publication Data

US 2022/0286496 A1    Sep. 8, 2022

Related U.S. Application Data

(63) Continuation of application No. PCT/CN2020/132069, filed on Nov. 27, 2020.

(30) Foreign Application Priority Data

Dec. 2, 2019   (CN) .......................... 201911210926.2

(51) Int. Cl.
   *H04L 67/08*   (2022.01)
   *G06F 3/14*    (2006.01)
   (Continued)

(52) U.S. Cl.
   CPC ............ *H04L 67/08* (2013.01); *G06F 3/1415* (2013.01); *G06F 3/1454* (2013.01);
   (Continued)

(58) Field of Classification Search
   CPC ... H04L 65/1083; H04L 65/1094–1095; H04L 67/025; H04L 67/01;
   (Continued)

(56) References Cited

U.S. PATENT DOCUMENTS 6,308,199 B1   10/2001   Katsurabayashi
9,270,713 B2   2/2016    Huang et al.
(Continued)

FOREIGN PATENT DOCUMENTS

CN   109451141 A   3/2019
CN   109831578 A   5/2019
(Continued)

OTHER PUBLICATIONS

Techotopia, "Displaying Ubuntu Linux Applications Remotely (X11 Forwarding)," http://www.techotopia.com/index.php/Displaying_Ubuntu_Linux_Applications_Remotely _ %28X I I _Forwarding.

*Primary Examiner* — Brendan Y Higa
(74) *Attorney, Agent, or Firm* — Price Heneveld, LLP

(57) ABSTRACT

This application provides an application sharing method, an electronic device, and a computer-readable storage medium. The method includes: receiving target application identification information and target device information; displaying, in a case that a first electronic device is connected to a target electronic device corresponding to the target device information, a running interface of a target application in a virtual screen; and sharing the running interface of the target application displayed in the virtual screen with the target electronic device.

12 Claims, 7 Drawing Sheets

(51) Int. Cl.
  *G06F 9/451* (2018.01)
  *H04L 67/025* (2022.01)
  *H04L 67/1095* (2022.01)

(52) U.S. Cl.
  CPC ............ *G06F 3/1462* (2013.01); *G06F 9/451* (2018.02); *H04L 67/025* (2013.01); *H04L 67/1095* (2013.01)

(58) Field of Classification Search
  CPC ............... H04L 67/1095; H04L 67/08; G06F 3/1423–1462; G06F 9/451–452; G06F 9/44; G06F 9/445
  See application file for complete search history.

(56) References Cited

U.S. PATENT DOCUMENTS

| | | | | |
|---|---|---|---|---|
| 9,848,027 | B2* | 12/2017 | Chen | H04W 4/023 |
| 10,200,464 | B2* | 2/2019 | Quan | H04L 67/148 |
| 11,474,657 | B2* | 10/2022 | Liao | G06F 3/0481 |
| 2004/0024819 | A1 | 2/2004 | Sasaki et al. | |
| 2005/0138566 | A1 | 6/2005 | Muller et al. | |
| 2012/0173622 | A1* | 7/2012 | Toledano | H04L 65/1094 709/204 |
| 2014/0258916 | A1* | 9/2014 | Laycock | G05B 23/0216 715/781 |
| 2014/0315489 | A1* | 10/2014 | Lee | H04M 1/72412 455/41.2 |
| 2015/0120817 | A1 | 4/2015 | Jeong et al. | |
| 2015/0326655 | A1* | 11/2015 | Quan | H04L 67/1097 709/201 |
| 2017/0093833 | A1 | 3/2017 | Sugaya | |
| 2017/0104818 | A1* | 4/2017 | Viggers | G06F 40/106 |
| 2017/0134452 | A1* | 5/2017 | Belimpasakis | H04L 65/1066 |
| 2018/0262793 | A1* | 9/2018 | Lau | H04N 21/43076 |
| 2018/0336373 | A1* | 11/2018 | Deenadayal | G06T 5/70 |
| 2019/0188012 | A1 | 6/2019 | Chen et al. | |
| 2019/0238599 | A1* | 8/2019 | Ingale | H04L 65/403 |
| 2020/0210131 | A1* | 7/2020 | Gomes Chang | G06F 3/04817 |
| 2021/0064191 | A1 | 3/2021 | Liao et al. | |
| 2021/0357106 | A1 | 11/2021 | Sun | |
| 2022/0147228 | A1 | 5/2022 | Yi et al. | |

FOREIGN PATENT DOCUMENTS

| | | |
|---|---|---|
| CN | 109857297 A | 6/2019 |
| CN | 109976821 A | 7/2019 |
| CN | 110471639 A | 11/2019 |
| CN | 110515579 A | 11/2019 |
| CN | 111026484 A | 4/2020 |
| CN | 111049979 A | 4/2020 |
| EP | 2804097 A1 | 11/2014 |
| EP | 3786792 A1 | 3/2021 |
| JP | 1165975 A | 3/1999 |
| JP | 20000099233 A | 4/2000 |
| JP | 2017068537 A | 4/2017 |
| JP | 2018093315 A | 6/2018 |
| JP | 2022502719 A | 1/2022 |
| KR | 20130024507 A | 3/2013 |
| KR | 20150049583 A | 5/2015 |
| KR | 20170038614 A | 4/2017 |
| KR | 20210028046 A | 3/2021 |
| WO | 2021035884 A1 | 3/2021 |

* cited by examiner

APPLICATION SHARING METHOD, ELECTRONIC DEVICE AND COMPUTER-READABLE STORAGE MEDIUM

CROSS-REFERENCE TO RELATED APPLICATIONS

The present application is a bypass continuation application of International Application No. PCT/CN2020/132069 filed on Nov. 27, 2020, which claims priority to Chinese Patent Application No. 201911210926.2 filed in China on Dec. 2, 2019, which are incorporated herein by reference in their entirety.

TECHNICAL FIELD

This application relates to the field of communication technologies, and in particular, to an application sharing method, an electronic device, and a computer-readable storage medium.

BACKGROUND

With the rapid development of computer technologies, functions of electronic devices are enriched, and demands for function sharing between different electronic devices are increasingly strong. For example, application sharing is a common sharing demand.

Currently, the most common method for application sharing between electronic devices is performing remote control through remote control software. That is, a connection between two electronic devices may be implemented through a remote control application. One device controls a desktop of the other device. In this case, applications and the like on the desktop may be viewed and used, so that applications on one of the foregoing devices may be shared with the other device. However, in the foregoing sharing process, the device that shares the applications is controlled by the other device, and no operation can be performed on the device, resulting in poor device utilization.

SUMMARY

Embodiments of this application provide an application sharing method, an electronic device, and a computer-readable storage medium.

According to a first aspect, the embodiments of this application provide an application sharing method, applicable to a first electronic device, the method including:

receiving target application identification information and target device information;

displaying, in a case that the first electronic device is connected to a target electronic device corresponding to the target device information, a running interface of a target application corresponding to the target application identification information in a virtual screen; and sharing the running interface of the target application displayed in the virtual screen with the target electronic device.

According to a second aspect, the embodiments of this application further provide a first electronic device, including:

an information receiving module, configured to receive target application identification information and target device information;

a processing module, configured to display, in a case that the first electronic device is connected to a target electronic device corresponding to the target device information, a running interface of a target application corresponding to the target application identification information in a virtual screen; and a sharing module, configured to share the running interface of the target application displayed in the virtual screen with the target electronic device.

According to a third aspect, the embodiments of this application further provide a first electronic device, including a memory and a processor, where the memory stores a computer program, and when executing the computer program, the processor implements steps in the application sharing method according to the embodiments of this application are implemented.

According to a fourth aspect, the embodiments of this application further provide a computer-readable storage medium, storing a computer program, where when executed by a processor, the computer program implements the steps in the application sharing method according to the embodiments of this application.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The technical solutions in the embodiments of this application are clearly described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Figure 1:
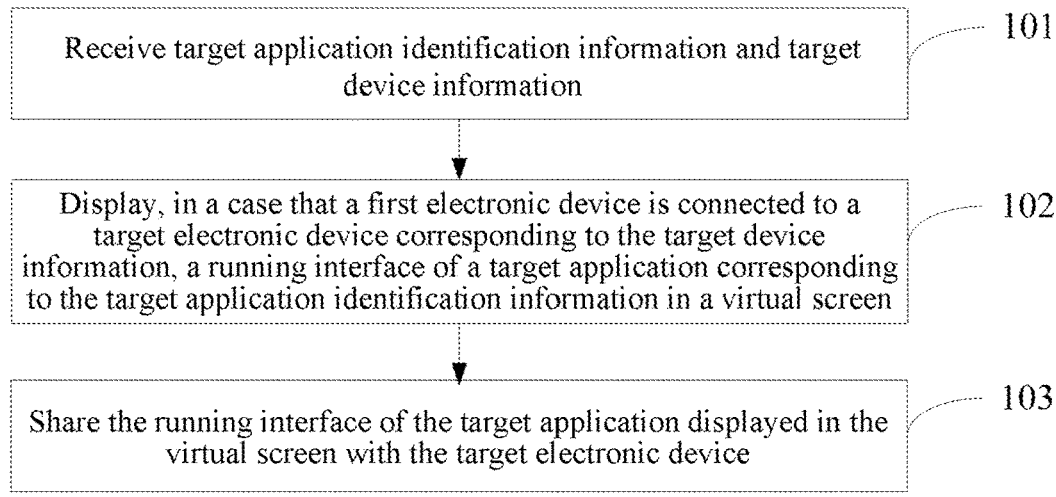
FIG. 1 is a flowchart 1 of an application sharing method according to an embodiment of this application.

As shown in FIG. 1, in an embodiment, an information sharing method is provided, applicable to a first electronic device, the method including the following steps.

Step 101: Receive target application identification information and target device information.

On the first electronic device, an application may be installed. For example, a plurality of applications are installed on the first electronic device. In a process of application sharing, all applications have corresponding identification information. Identification information of an application that needs to be shared, that is, target application identification information, may be first determined from the application identification information of the plurality of applications that are installed, so that the application that needs to be shared can be determined. In addition, it is also necessary to determine, from device information of a plurality of electronic devices connectable to the first electronic device, device information of a target electronic device that receives application sharing, that is, the target device information.

Step 102: Display, in a case that a first electronic device is connected to a target electronic device corresponding to the target device information, a running interface of a target application corresponding to the target application identification information in a virtual screen.

In a process of sharing the target application, the target application is shared with the target electronic device. In this case, it is necessary to establish a connection between the first electronic device and the target electronic device. That is, in a case that the first electronic device is connected to the target electronic device, a running interface of the target application corresponding to the target application identification information may be displayed in the virtual screen. That is, the running interface of the target application corresponding to the target application identification information is run in the virtual screen.

Step 103: Share the running interface of the target application displayed in the virtual screen with the target electronic device.

By displaying the running interface on the virtual screen, the running interface of the target application displayed in the virtual screen can be shared with the target electronic device. Moreover, the running interface of the target application is displayed in the virtual screen, so as to implement the sharing of the target application.

In the application sharing method of the embodiments of this application, the running interface of the target application that needs to be shared is displayed in the virtual screen. In this case, a user may still perform other operations on a first electronic device, for example, related operations for other applications and other functional operations, and the operations performed by the user on the first electronic device are not affected by the target application sharing. It can be understood that in a process in which the first electronic device shares a target application, because a running interface of the target application is displayed on the created virtual screen, only the running interface of the target application displayed in the virtual screen is shared with the target electronic device. Other functions of the first electronic device are not affected, and a user can still perform operations on the first electronic device, which can improve the utilization of the first electronic device.

In an example, the first electronic device and target electronic device may be, but are not limited to, a mobile phone, a tablet personal computer, a laptop computer, a personal digital assistant (PDA), a mobile Internet device (MID), or a wearable device.

In an embodiment, before the displaying a running interface of a target application corresponding to the target application identification information in a virtual screen, the method further includes: creating the virtual screen, and starting the target application corresponding to the target application identification information.

That is, in a case that the first electronic device is connected to the target electronic device, the virtual screen may be created first, the target application is started, and then the running interface of the target application is displayed in the virtual screen, that is, the target application is still run. In this case, a user may still perform other operations on a first electronic device, for example, related operations for other applications and other functional operations, and the operations performed by the user on the first electronic device are not affected by the first application sharing. In an example, the running interface of the first application may be switched from a foreground to the virtual screen for displaying. In this way, the running interface may no longer be displayed on the foreground, thereby reducing power consumption.

In an embodiment, the virtual screen is created, and the target application corresponding to the target application identification information is started, including: creating the virtual screen on a background, and starting the target application corresponding to the target application identification information.

That is, in a case that the first electronic device is connected to the target electronic device, the virtual screen is created on the background of the first electronic device, the virtual screen is run on the background, and the running interface of the target application is displayed in the virtual screen, that is, the target application is still run. Because the virtual screen is created on the background, that is, the virtual screen is run on the background, the running interface of the target application is run in the virtual screen, that is, the running interface may be run on the background. In this case, a user may still perform other operations on a first electronic device, for example, related operations for other applications and other functional operations, and the operations performed by the user on the first electronic device are not affected by the target application sharing. In an example, it can be understood that the target application is started on the background, and is run in the virtual screen after being started. That is, during application sharing, the target application no longer needs to be run on the foreground. After a connection is established with the target electronic device, the virtual screen is created on the background, the target application is started on the background, and the target application is run in the virtual screen.

Figure 2:
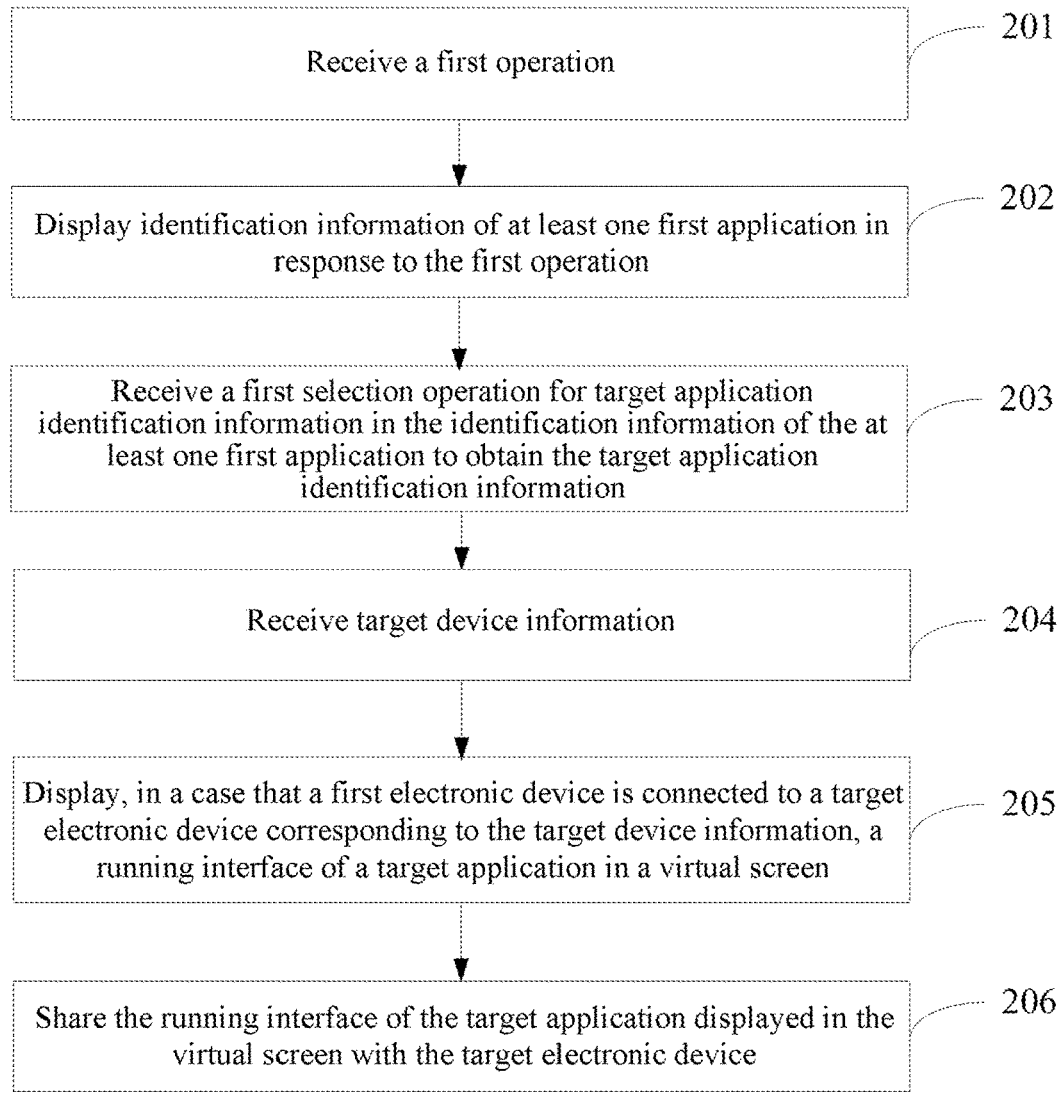
FIG. 2 is a flowchart 2 of an application sharing method according to an embodiment of this application.

In an embodiment, the receiving target application identification information includes:

receiving a first operation; displaying identification information of at least one first application in response to the first operation; and receiving a first selection operation for the target application identification information in the identification information of the at least one first application to obtain the target application identification information. It may be understood that, in this embodiment, referring to FIG. 2, an application sharing method is provided, applicable to a first electronic device, the method including the following steps:

Step 201: Receive a first operation;

Step 202: Display identification information of at least one first application in response to the first operation.

Step 203: Receive a first selection operation for target application identification information in the identification information of the at least one first application to obtain the target application identification information.

Step 204: Receive target device information.

Step 205: Display a running interface of a target application in a virtual screen in a case that a first electronic device is connected to a target electronic device corresponding to the target device information.

Step 206: Share the running interface of the target application displayed in the virtual screen with the target electronic device.

Step 204 corresponds to the step of determining the target electronic device in step 101, and steps 205 to 206 are in a one-to-one correspondence with steps 102 to 103, and details are not described herein again.

The first application is an application installed on the first electronic device, and the user may select, from the at least one first application, an application that needs to be shared. First, the user performs a first operation on the first electronic device, and after receiving the first operation, the first electronic device may display the identification information of the at least one first application, for example, an application name, which is convenient for the user to view and select. Target application identification information may be selected from the at least one piece of identification information, and a target application corresponding to the target application identification information is a selected application that needs to be shared. In an example, a first prompt window may be displayed in response to the first operation. The identification information of the at least one first application is displayed in the first prompt window, and the user may select the target identification information in the first prompt window, which is convenient for the user to view the identification information and make a selection.

In an embodiment, the receiving a first operation includes: receiving a second operation on a display screen of the first electronic device; displaying a control window in response to the second operation, where the control window includes an application sharing control; and receiving a third operation for the application sharing control.

An operation is performed on the display screen to call the control window, and then an operation is performed for an application sharing control in the control window. It can be understood that the first operation includes the second operation and the third operation. In an example, the third operation may be a click/tap operation for the application sharing control or the like. In an example, the second operation may include, but is not limited to, a swipe operation on the display screen in a first preset direction, a pull-down operation for a status bar, or a click/tap operation for a floating control on the display screen, or the like.

In an embodiment, after the displaying a control window, the method further includes: updating a name of the application sharing control based on a name of the target application, where an updated name of the application sharing control is displayed in the control window.

In this embodiment, the control window may be displayed in response to the second operation, and then a name of the application sharing control may be updated by using a name of the target application, and an updated name is displayed in the control window, which helps the user learn the name of the shared first application. For example, the name of the application sharing control is "Application sharing", the name of the target application is X, and the name of the application sharing control is updated based on the name of the target application. For example, the updated name of the application sharing control may be "Sharing application X", which helps the user view the name of the shared application. In an example, after a response operation is received, the name of the application sharing control may be updated based on the name of the first application. That is, updating of the name and displaying of the control window may be synchronous performed, and the updated name is displayed after the control window is displayed.

In an embodiment, a manner of receiving target device information includes: receiving a fourth operation; displaying device information of at least one second electronic device in response to the fourth operation; and receiving a second selection operation for target device information in the device information of the at least one second electronic device to obtain the target device information.

The second electronic device is an electronic device connectable to the first electronic device, and can display the device information of the at least one second electronic device, to help the user view the device information of the second electronic device connectable to the first electronic device, for example, a device name. Then, an electronic device that receives application sharing may be selected from the at least one second electronic device, and the target electronic device may be a second electronic device selected by a user from the at least one second electronic device. After the foregoing process, information about the target device can be obtained, so that the target electronic device that receives the application sharing can be determined for subsequent application sharing.

In an example, before the displaying device information of at least one second electronic device, the method further includes: performing device scanning to obtain the device information of the at least one second electronic device. For example, a Bluetooth function of the first electronic device is activated to scan for a connectable device, and a Bluetooth-connectable second electronic device may be scanned. It can be understood that a Bluetooth function of the second electronic device is also active at this time, and a distance between the second electronic device and the first electronic device falls within a distance range in which a Bluetooth signal may be received. In this way, the first electronic device may scan, through the Bluetooth, the Bluetooth-connectable second electronic device.

The target application identification information may be received before or after the target device information is received, and a receiving sequence is not limited. In an example, in a case that the target device information is received after the target application identification information is received, a fourth operation may be received after the name of the application sharing control is updated based on the name of the target application, and then the target device information is selected. That is, the electronic device information is selected after the name is updated. In this example, the fourth operation may be a click/tap operation for the application sharing control with the name updated. In an example, in a case that the target device information is received before the target application identification information is received, the step of receiving a fourth operation in a process of receiving the target device information may include: receiving a second operation on a display screen of the first electronic device; displaying a control window in response to the second operation, where the control window includes an application sharing control; and receiving a fourth operation (for example, a click/tap operation) for the application sharing control, where the first operation is an operation for the application sharing control after the fourth operation, for example, a click/tap operation, is performed.

In an example, a second prompt window may be displayed in response to the fourth operation, the device information of the at least one second electronic device is displayed in the second prompt window, and the user may select the target electronic device in the second prompt window, which helps the user view device information and make a selection.

In an embodiment, before the displaying, in a case that the first electronic device is connected to a target electronic device corresponding to the target device information, a running interface of a target application corresponding to the target application identification information in a virtual screen, the method further includes: sending a first request to the target electronic device; and establishing a connection with the target electronic device in a case that confirmation information sent by the target electronic device based on the first request is received.

That is, after the target electronic device is determined, in a case that the first electronic device is connected to the target electronic device corresponding to the target device information, the target application corresponding to the target application identification information is started, and the running interface of the target application is displayed in the virtual screen. To establish a connection with the target electronic device, the first electronic device needs to first send a first request to the target electronic device, and after receiving the first request, the target electronic device may display a third prompt window, where the third prompt window includes a Receive control and a Reject control. In a case that the user clicks/taps the Receive control, after receiving the click/tap operation for the Receive control, the target electronic device sends confirmation information to the first electronic device, which means to receive the application sharing of the first electronic device. In a case that the user clicks/taps the Reject control, after receiving the click/tap operation for the Reject control, the target electronic device sends rejection information to the first electronic device, which means to reject the application sharing of the first electronic device. In a case that the first electronic device receives the confirmation information sent by the target electronic device based on the first request, the first electronic device establishes a connection with the target electronic device. In this way, the target application may be shared with the target electronic device.

The process of application sharing is described in detail below using a specific embodiment. Descriptions are provided by using an example in which the first electronic device is a device A, the first application is an application X, and the target electronic device is a device C.

Figure 3:
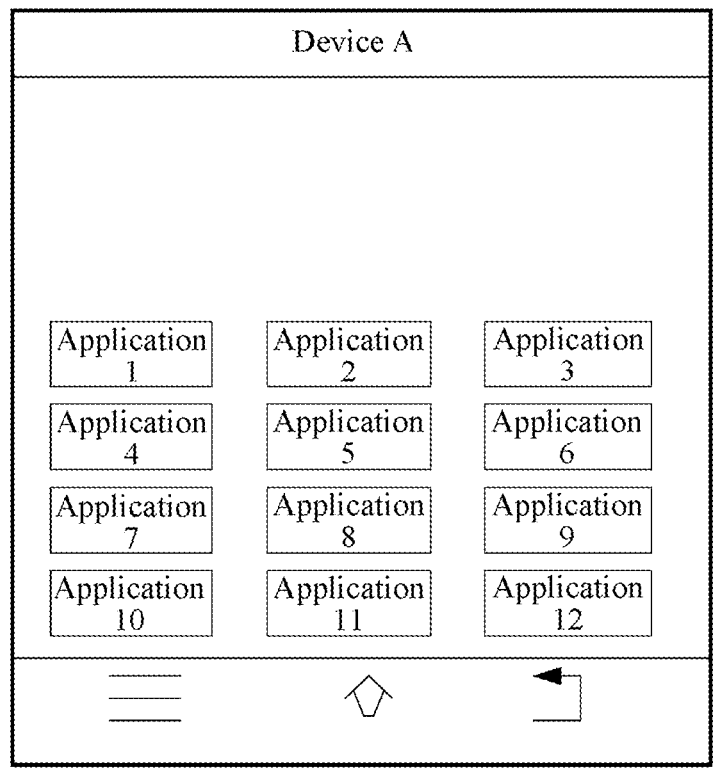
FIG. 3 is an interface diagram 1 of a first electronic device according to an embodiment of this application.
Figure 4:
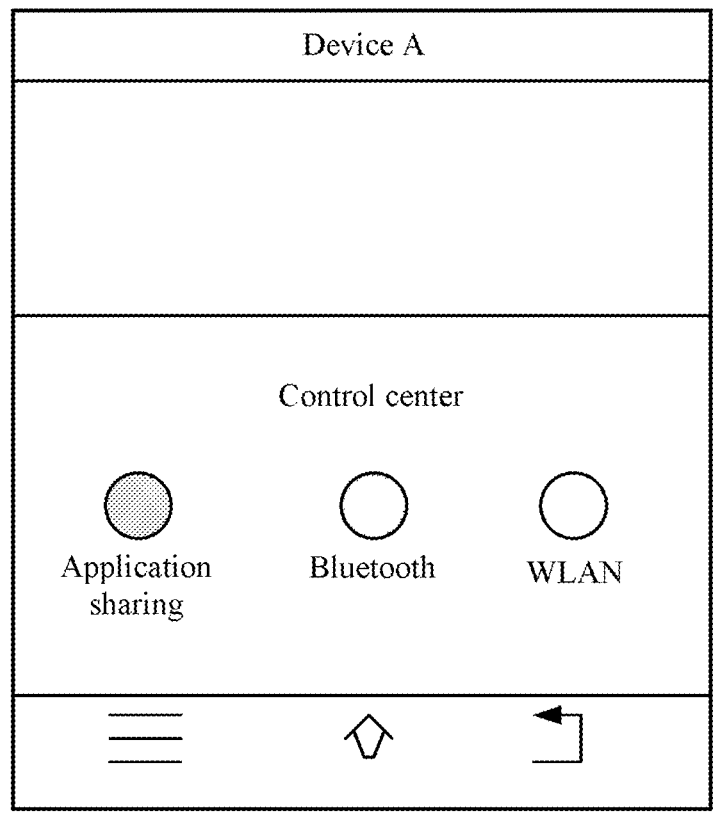
FIG. 4 is an interface diagram 2 of a first electronic device according to an embodiment of this application.

First, the display screen of the device A displays a main interface. As shown in FIG. 3, an application sharing function or an application sharing shortcut entry are enabled on the device A. Specifically, there is an application sharing shortcut entry on a control center of the device A, and a second operation, for example, pulling down a status bar on the display screen, swiping up on the display screen, or performing a click/tap operation on a floating control on the display screen, may be performed on the first electronic device. A control window (which may be understood as a control center) may be displayed in response to the second operation, as shown in FIG. 4. The control window includes an application sharing control named "Application sharing", which is a shortcut entry for application sharing. Alternatively, an application sharing function may be implemented through an application, that is, the application is an application capable of implementing application sharing. After the application is opened, the target application and the target electronic device may be determined by performing operations in the application, that is, may be determined through the received target application identification information and the target device information.

Figure 5:
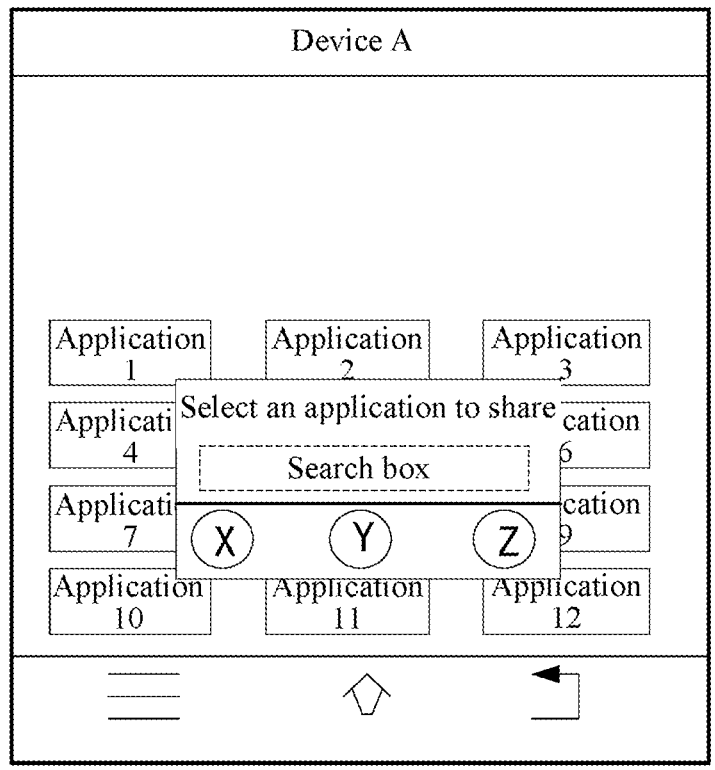
FIG. 5 is an interface diagram 3 of a first electronic device according to an embodiment of this application.
Figure 6:
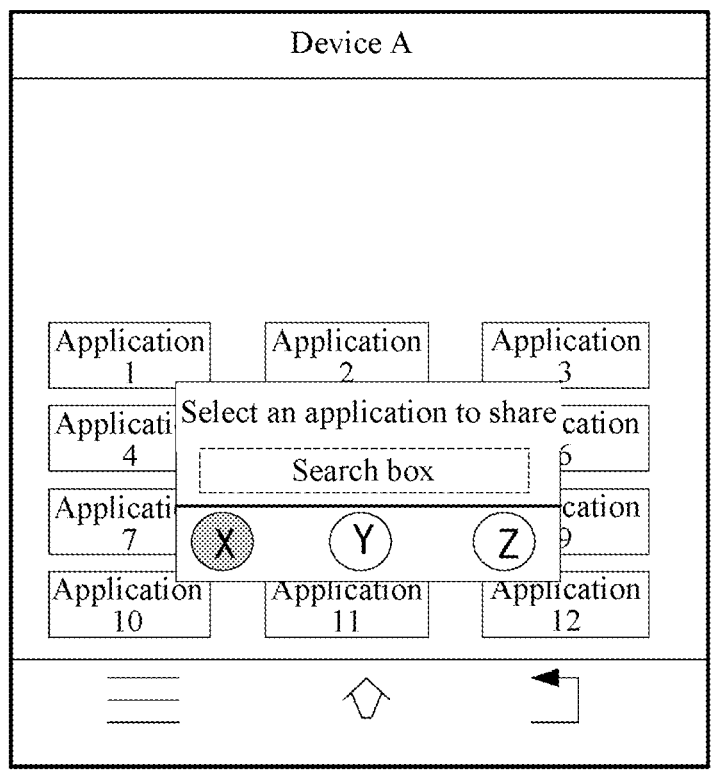
FIG. 6 is an interface diagram 4 of a first electronic device according to an embodiment of this application.

A click/tap operation is performed for the application sharing control in the control window of the device A, and application scanning is performed in response to the click/tap operation. Identification information of shareable applications installed on the device A is listed, regardless of whether the applications are run or not. That is, the identification information (which may be understood as a list of identification information) of the at least one first application is displayed, as shown in FIG. 5. For example, the at least one first application includes an application X, an application Y, and an application Z, of which application names respectively correspond to X, Y, and Z. The first prompt window including the application sharing control (named application sharing) may pop up. The first prompt window further includes the name of the application X, the name of the application Y, and the name of the application Z, and the first prompt window displays a prompt message "Select an application to share" to prompt the user. In a case that the user wants to share the application X, the user may browse the displayed list of identification information and find the application name of the application X to determine the target application X, as shown in FIG. 6. In addition, the first prompt window further includes a search box. The user may enter the application name in the search box to search, and find a matching application name, thereby determining the target application X. After the target application X is determined, the name of the application sharing control may be updated according to the application name of the application X, for example, to "Sharing application X".

Then, the user may click/tap the name of the control center to update the name to the application sharing control of the "Sharing application X". Device scanning is started in response to the click/tap operation, and three connectable devices are scanned through Bluetooth, Wi-Fi P2P (Wi-Fi peer-to-peer, Wi-Fi is wireless fidelity), a web server, or history records. For example, names of three devices are respectively B, C, D, and the like.

Figure 7:
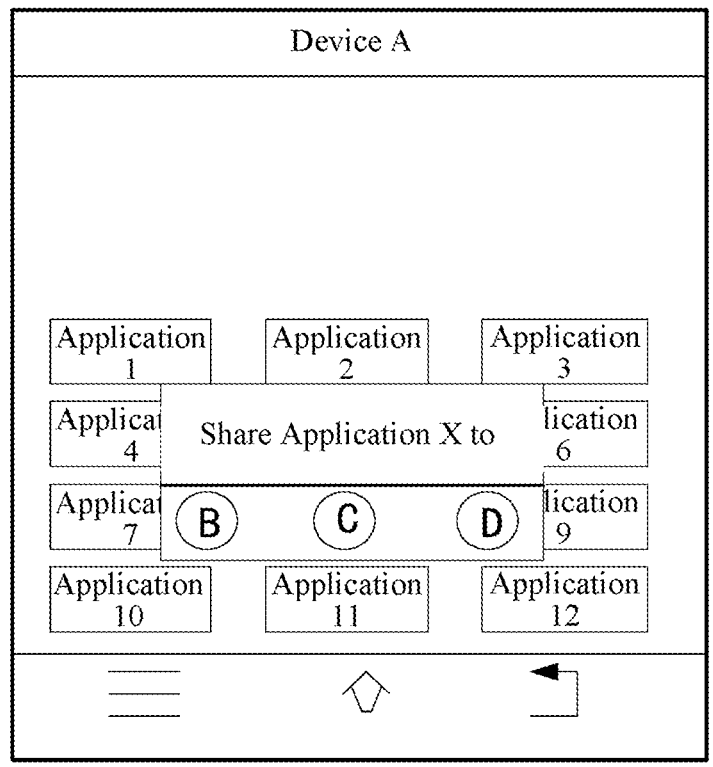
FIG. 7 is an interface diagram 5 of a first electronic device according to an embodiment of this application.
Figure 8:
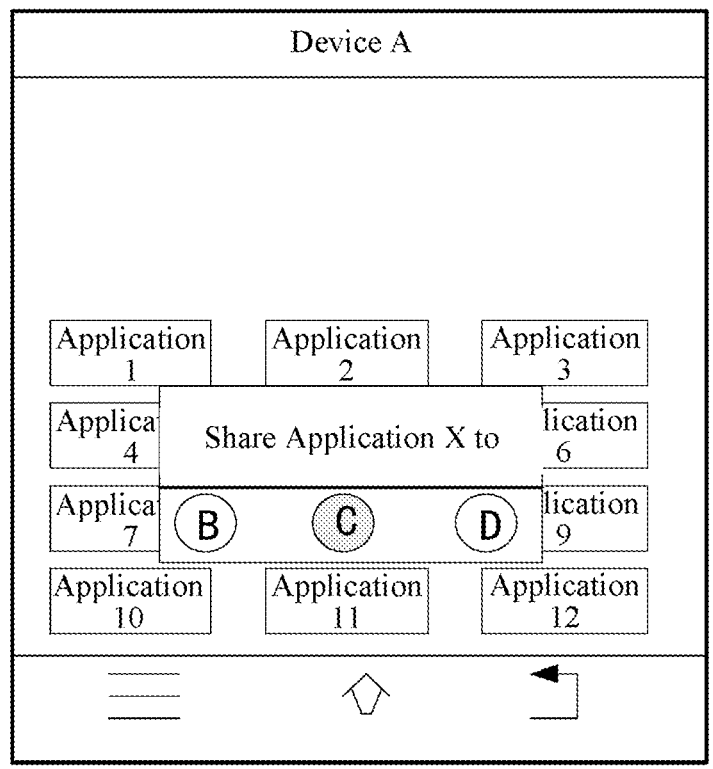
FIG. 8 is an interface diagram 6 of a first electronic device according to an embodiment of this application.

As shown in FIG. 7, device names of the three devices may be displayed, and the user may select a device name for application sharing from the displayed device names. For example, in a case that the user clicks/taps a device name C, a device C is selected as a device that receives application sharing, as shown in FIG. 8. In a case that the device C is at a local end, the device C may be connected by Bluetooth, Wi-Fi P2P, or a network server. In a case that the device C is at a remote end, the device C may be connected by a network server.

Figure 9:
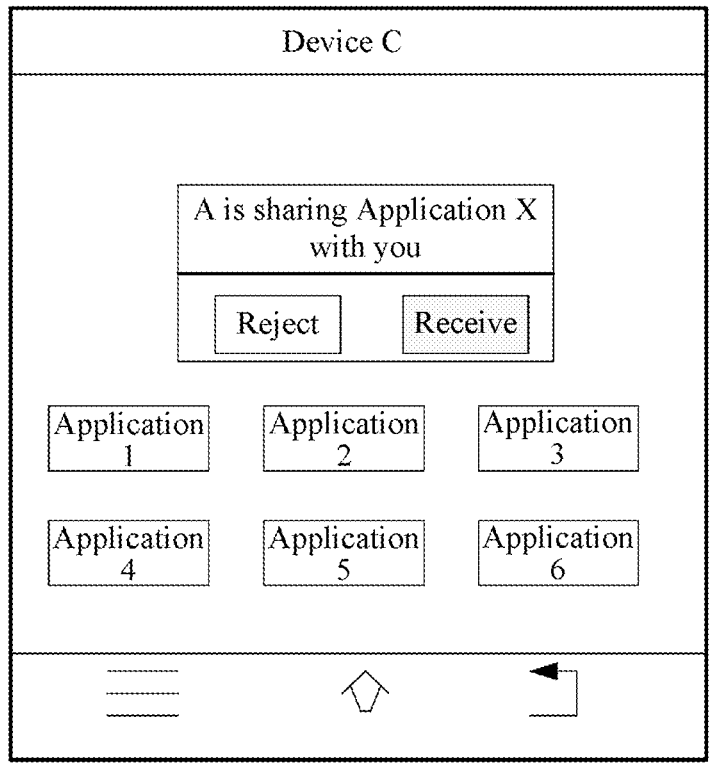
FIG. 9 is an interface diagram 1 of a target electronic device according to an embodiment of this application.

The device A sends a first request to the device C, and after the device C receives the first request, the device C displays a third prompt window. As shown in FIG. 9, the third prompt window includes a Receive control and a Reject control, and a recipient clicks/taps the Receive control on the device C to confirm that establishment of a connection, that is, sends confirmation information to the device A. After the device A receives the confirmation information, a connection is established with the device C. The device A is ready to perform application sharing.

Figure 10:
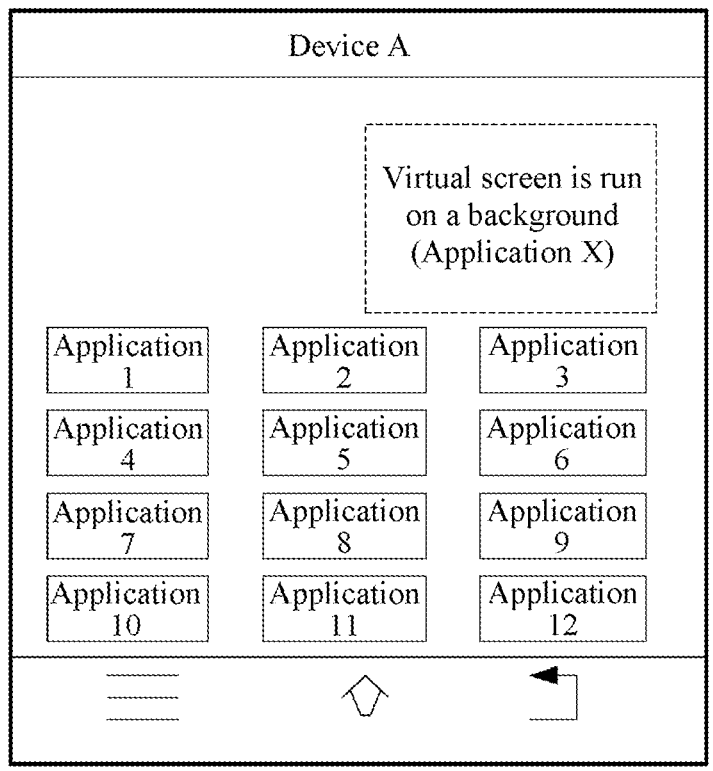
FIG. 10 is an interface diagram 7 of a first electronic device according to an embodiment of this application.

Specifically, the device A creates a virtual screen on a background. In this case, the virtual screen is not displayed on the home screen (that is, not displayed on the display screen, which can be understood as that the virtual screen is not run on a foreground, but is run on the background, as shown in FIG. 10, where being run on the background instead of being run on the foreground is represented by dashed lines). The application X is started on the background, and a running interface of the application X is run in the virtual screen.

Figure 11:
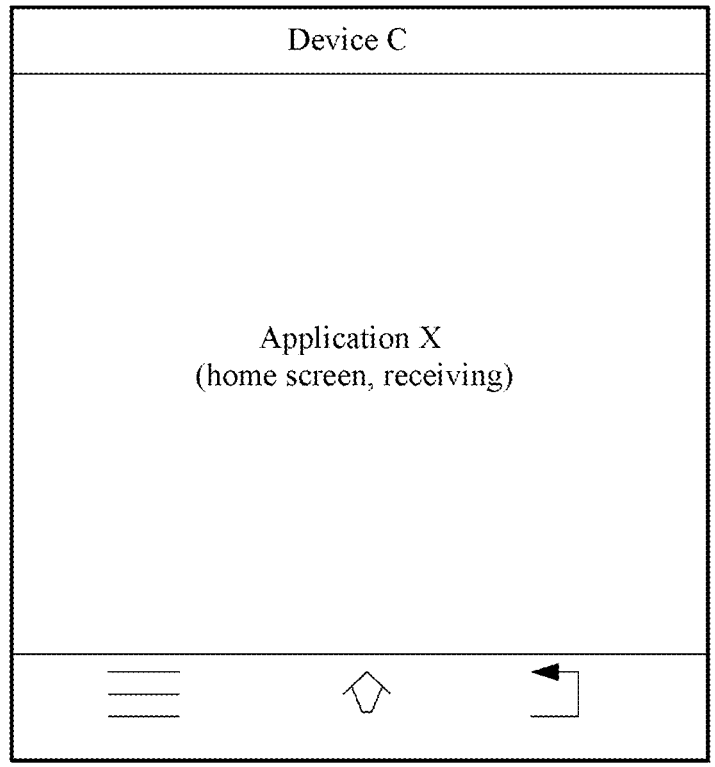
FIG. 11 is an interface diagram 2 of a target electronic device according to an embodiment of this application.

The device A may share the running interface of the target application displayed in the virtual screen with the device C, and the device C receives the displayed content. As shown in FIG. 11, the received running interface of the target application displayed in the virtual screen is displayed on the screen (that is, the home screen), so that the application X is shared.

Through the application sharing method of the foregoing embodiments, the first electronic device may receive the target application identification information in the identification information of the at least one first application, thereby determining the target application, start the target application and run the target application in the virtual screen created on the background, and then record the target application to share the target application with the target electronic device. Both devices can simultaneously view and use the target application, and progresses of both parties are synchronized, thereby implementing What You See Is What You Get. In addition, in the sharing process, the use of other applications on the device is not affected, so that functions of other applications can be used without interrupting the sharing. Moreover, the shared target application may be run on the foreground again at any time, which not only ensures the experience of the recipient of the application, but also prevents the application sharing party from being affected in completing other work on the first electronic device, and the behavior logic is natural and efficient, and can improve the device utilization.

Figure 12:
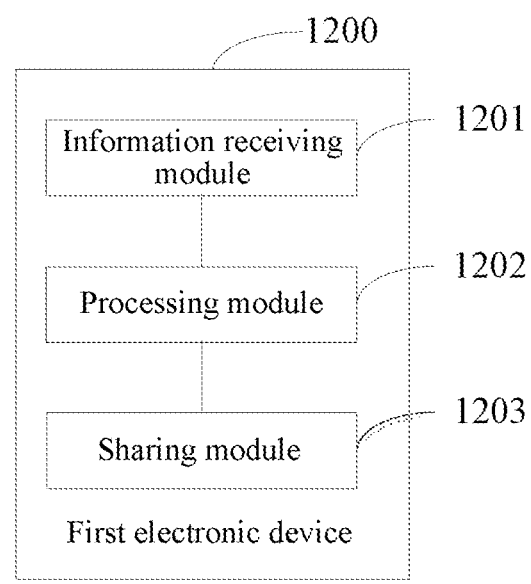
FIG. 12 is a schematic diagram 1 of an electronic device according to an embodiment of this application.

Referring to FIG. 12, this application further provides a first electronic device 1200, including:
 an information receiving module 1201, configured to receive target application identification information and target device information;
 a processing module 1202, configured to display, in a case that a first electronic device is connected to a target electronic device corresponding to the target device information, a running interface of a target application corresponding to the target application identification information in a virtual screen; and
 a sharing module 1203, configured to share the running interface of the target application displayed in the virtual screen with the target electronic device.

In an embodiment, the electronic device further includes:
 a control module, configured to create the virtual screen, and start the target application corresponding to the target application identification information.

In an embodiment, the information receiving module includes:
 a first receiving module, configured to receive a first operation;
 a second display module, configured to display identification information of at least one first application in response to the first operation; and
 an obtaining module, configured to receive a first selection operation for the target application identification information in the identification information of the at least one first application to obtain the target application identification information.

In an embodiment, the first receiving module includes:
 a second receiving module, configured to receive a second operation on the first electronic device;
 a control window display module, configured to display a control window in response to the second operation, where the control window includes an application sharing control; and
 a third receiving module, configured to receive a third operation for the application sharing control.

In an embodiment, the electronic device further includes:
 an updating module, configured to update, after the control window display module displays the control window, a name of the application sharing control based on a name of the target application.

An updated name of the application sharing control is displayed in the control window.

Technical features in the electronic device provided in the embodiments of this application correspond to technical features in the application sharing method, and all processes of the application sharing method may be implemented through the electronic device, and the same effects may be obtained. To avoid repetition, details are not described herein again.

Figure 13:
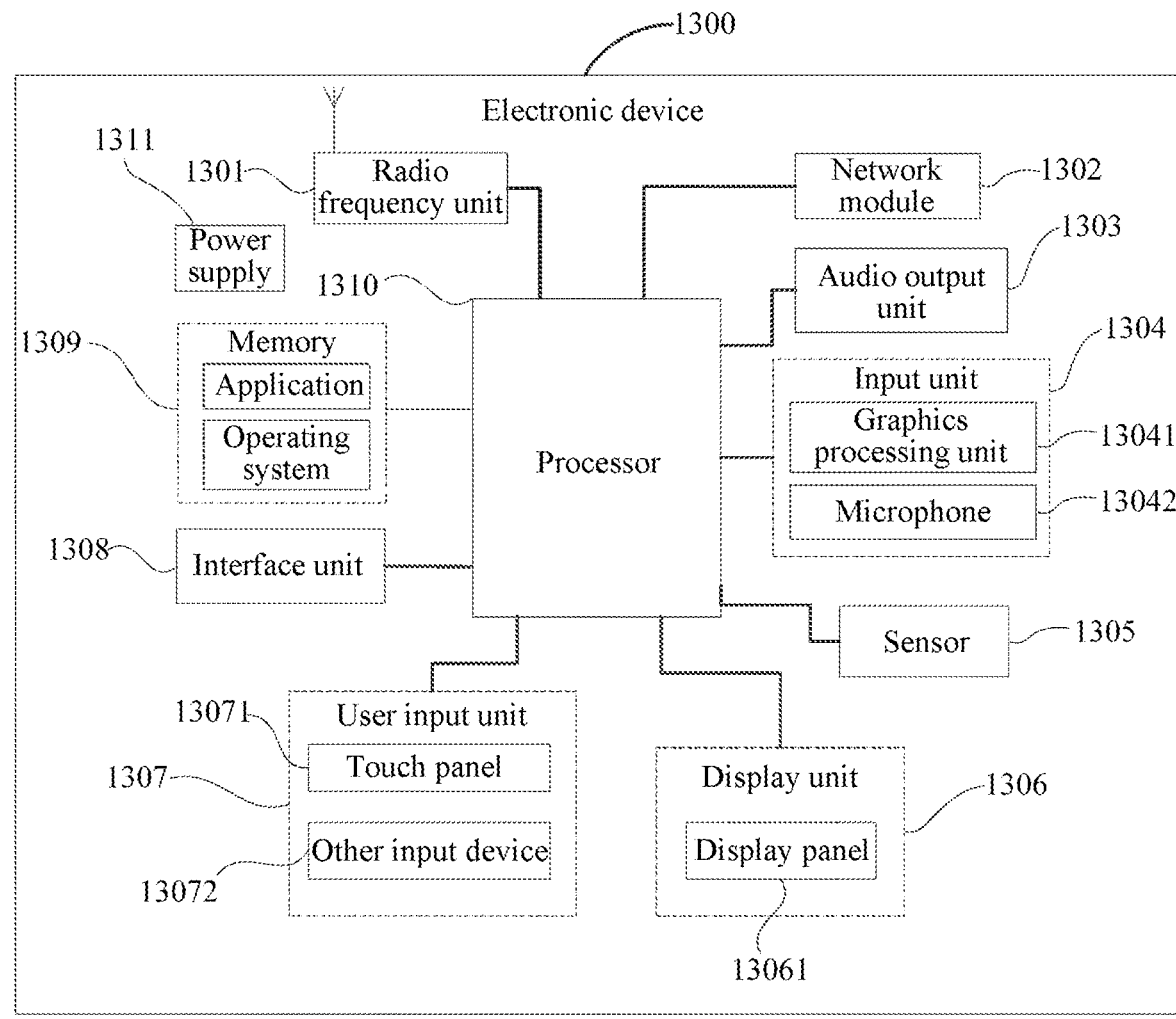
FIG. 13 is a schematic diagram of a hardware structure of an electronic device according to an embodiment of this application.

FIG. 13 is a schematic diagram of a hardware structure of an electronic device according to the embodiments of this application. The electronic device 1300 includes, but is not limited to, components such as a radio frequency unit 1301, a network module 1302, an audio output unit 1303, an input unit 1304, a sensor 1305, a display unit 1306, a user input unit 1307, an interface unit 1308, a memory 1309, a processor 1310, and a power supply 1311. A person skilled in the art may understand that the electronic device structure shown in FIG. 13 does not constitute a limitation to the electronic device. The electronic device may include more or fewer components than those shown in the figure, or some components may be combined, or a different component deployment may be used. In this embodiment of this application, the electronic device includes, but is not limited to, a mobile phone, a tablet computer, a notebook computer, a palmtop computer, an in-vehicle mobile terminal, a wearable device, a pedometer, and the like.

The processor 1310 is configured to receive target application identification information and target device information; display, in a case that a first electronic device is connected to a target electronic device corresponding to the target device information, a running interface of a target application corresponding to the target application identification information in a virtual screen; and share the running interface of the target application displayed in the virtual screen with the target electronic device.

Because the virtual screen is created on the background, the running interface of the target application is displayed in the virtual screen. In this case, a user may still perform other operations on a first electronic device, for example, related operations for other applications and other functional operations, and the operations performed by the user on the first electronic device are not affected by the target application sharing. It can be understood that in a process of sharing the target application by the first electronic device, because the running interface of the target application is run in the virtual screen, and other functions of the first electronic device are not affected, the user can still perform operations on the first electronic device, which can improve the utilization of the first electronic device.

It should be understood that, in this embodiment of this application, the radio frequency unit 1301 may be configured to send and receive a signal during an information receiving and sending process or a call process. Specifically, the radio frequency unit receives downlink data from a base station, then delivers the downlink information to the processor 1310 for processing; and in addition, sends related uplink data to the base station. Generally, the radio frequency unit 1301 includes, but is not limited to, an antenna, at least one amplifier, a transceiver, a coupler, a low noise amplifier, a duplexer, and the like. In addition, the radio frequency unit 1301 may further communicate with the network and another device through wireless communication system.

The electronic device provides wireless broadband Internet access for a user by using the network module 1302, for example, helps the user to send and receive an email, browse a webpage, and access stream media, and the like.

The audio output unit 1303 may convert audio data received by the radio frequency unit 1301 or the network module 1302 or stored on the memory 1309 into audio signals and output the audio signals as sounds. In addition, the audio output unit 1303 may further provide an audio output that is related to a particular function executed by the electronic device 500 (for example, a call signal receiving sound or a message receiving sound). The audio output unit 1303 includes a speaker, a buzzer, a receiver, and the like.

An input unit 1304 is configured to receive an audio signal or a video signal. The input unit 1304 may include a graphics processing unit (GPU) 13041 and a microphone 13042. The GPU 13041 processes image data of a static picture or a video acquired by an image capturing electronic device (for example, a camera) in a video capturing mode or an image capturing mode. The processed image frame can be displayed on the display unit 1306. The image frame processed by the graphics processing unit 13041 may be stored on the memory 1309 (or another storage medium) or sent through the radio frequency unit 1301 or the network module 1302. The microphone 13042 can receive sound and can process such sound into audio data. The processed audio data may be transferred, in a phone talk mode, to a format that may be sent to a mobile communication base station via the radio frequency unit 1301 to output.

The electronic device 600 may further include at least one sensor 1305, such as an optical sensor, a motion sensor, and other sensors. Specifically, the optical sensor includes an ambient light sensor and a proximity sensor, where the ambient light sensor may adjust luminance of the display panel 13061 according to brightness of the ambient light. The proximity sensor may switch off the display panel 13061 and/or backlight when the electronic device 600 is moved to the ear. As one type of motion sensor, an acceleration sensor may detect magnitude of accelerations in various directions (which generally are triaxial), may detect magnitude and a direction of the gravity when static, and may be configured to identify an electronic device attitude (such as switchover between horizontal and vertical screens, a related game, and attitude calibration of a magnetometer), a related function of vibration identification (such as a pedometer and a knock); and the sensor 1305 may further include a fingerprint sensor, a pressure sensor, an iris sensor, a molecular sensor, a gyroscope, a barometer, a hygrometer, a thermometer, an infrared sensor, and the like, and details are not described herein again.

The display unit 1306 may be configured to display information input by the user or information provided for the user. The display unit 1306 may include a display panel 13061. The display panel 13061 may be configured by using a liquid crystal display (LCD), an organic light-emitting diode (OLED), or the like.

A user input unit 1307 may be configured to: receive input numeral or character information, and generate a key signal input related to a user setting and function control of the electronic device. Specifically, the user input unit 1307 includes a touch panel 13071 and another input device 13072. The touch panel 13071, also referred to as a touchscreen, may collect a touch operation of a user on or near the touch panel (such as an operation of a user on or near the touch panel 13071 by using any suitable object or attachment, such as a finger or a stylus). The touch panel 13071 may include two parts: a touch detection electronic device and a touch controller. The touch detection electronic device detects a touch position of the user, detects a signal generated by the touch operation, and transfers the signal to the touch controller. The touch controller receives touch information from the touch detection electronic device, converts the touch information into touch point coordinates, and transmits the touch point coordinates to the processor 1310. In addition, the touch controller receives a command transmitted by the processor 1310 and execute the command. In addition, the touch panel 13071 may be implemented by using various types, such as a resistive type, a capacitive type, an infrared type, and a surface acoustic wave type. In addition to the touch panel 13071, the user input unit 1307 may further include the another input device 13072. Specifically, the another input device 13072 may include, but is not limited to, a physical keyboard, a functional key (such as a volume control key or a switch key), a track ball, a mouse, and a joystick, and details are not described herein again.

Further, the touch panel 13071 may cover the display panel 13061. After detecting a touch operation on or near the touch panel 13071, the touch panel transfers the touch operation to the processor 1310, to determine a type of a touch event. Then, the processor 1310 provides a corresponding visual output on the display panel 13061 according to the type of the touch event. Although, in FIG. 13, the touch panel 13071 and the display panel 13061 are used as two separate parts to implement input and output functions of the electronic device, in some embodiments, the touch panel 13071 and the display panel 13061 may be integrated to implement the input and output functions of the electronic device, which are not limited herein.

The interface unit 1308 is an interface for connecting an external electronic device to the electronic device 500. For example, the external electronic device may include a wired or wireless headset port, an external power supply (or battery charger) port, a wired or wireless data port, a memory card port, a port for connecting an electronic device with a recognition module, an audio input/output (I/O) port, a video I/O port, a headphone port, and the like. The interface unit 1308 may be configured to receive an input (such as data information or electric power) from an external electronic device and transmit the received input to one or more elements in the electronic device 500 or may be configured to transmit data between the electronic device 500 and an external electronic device.

The memory 1309 may be configured to store a software program and various data. The memory 1309 may mainly include a program storage region and a data storage region. A program storage area may store an operating system, an application program required by at least one function (such as a sound playback function and an image display function), and the like. A data storage area may store data (such as audio data and a telephone directory) created according to use of the mobile phone, and the like. In addition, the memory 1309 may include a high speed random access memory, and may further include a non-volatile memory, such as at least one magnetic disk storage device, a flash memory, or another volatile solid-state storage device.

The processor 1310 is a control center of the electronic device, and connects various parts of the entire electronic device by using various interfaces and lines. By running or executing the software program and/or module stored in the memory 1309, and invoking data stored in the memory 1309, the processor 1310 performs various functions of the electronic device and processes data, thereby performing overall monitoring on the electronic device. The processor 1310 may include one or more processing units. Preferably, the processor 1310 may integrate an application processor and a modem. The application processor mainly processes an operating system, a user interface, an application program, and the like. The modem mainly processes wireless communication. It may be understood that the foregoing modem processor may either not be integrated into the processor 1310.

The electronic device 500 may further include the power supply 1311 (such as a battery) for supplying power to the components. Preferably, the power supply 1311 may logically connect to the processor 1310 by using a power supply management system, thereby implementing functions, such as charging, discharging, and power consumption management, by using the power supply management system.

In addition, the electronic device 600 includes some unshown functional modules, and details are not described herein again The embodiments of this application further provide an electronic device, including a processor 1310 and a memory 1309, where the memory 1309 stores a computer program running on the processor 1310, where when executed by the processor 1310, the computer program implements the processes of the embodiment of the application sharing method, and can achieve the same technical effects. To avoid repetition, details are not described herein again.

The embodiments of this application further provide a computer-readable storage medium, storing a computer program, where when executed by a processor, the computer program implements the processes of the embodiment of the application sharing method, and can achieve the same technical effects. To avoid repetition, details are not described herein again. The computer-readable storage medium is, for example, a ROM (Read-Only Memory), a RAM (Random Access Memory), a magnetic disk, an optical disc or the like.

It may be understood that, some embodiments described in the embodiments of the present disclosure may be implemented by using software, hardware, firmware, middleware, microcode, or a combination thereof. For hardware implementation, a module, a unit, a sub-module, and a sub-unit may be implemented in one or more application-specific integrated circuits (ASIC), a digital signal processor (DSP), a digital signal processing device (DSP Device, DSPD), a programmable logic device (PLD), a field-programmable gate array (FPGA), a general purpose processor, a controller, a micro-controller, a microprocessor, and other electronic units configured to execute the functions described in this application, or a combination of the above.

It should be further noted that, in this specification, the term "comprise", "include", or any other variant is intended to encompass non-exclusive include, so that a process, a method, an article, or an electronic device including a series of elements not only includes those elements, but also includes other elements not explicitly listed, or further includes elements inherent in the process, the method, the article, or the electronic device. Without other limitations, for an element defined by the statement "includes a . . . ", it is not excluded that there are other same elements in a process, a method, an article, or an electronic device including the element.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the related art may be implemented in the form of a software product. The computer software product is stored in a storage medium (for example, a read-only memory (ROM)/random access memory (RAM), a magnetic disk, or an optical disc), and includes several instructions for instructing an electronic device (which may be a smartphone, a computer, a server, an air conditioner, a network device, or the like) to perform the method described in the embodiments of this application.

The technical features in the above embodiments may be randomly combined. For concise description, not all possible combinations of the technical features in the embodiment are described. However, provided that combinations of the technical features do not conflict with each other, the combinations of the technical features are considered as falling within the scope recorded in this specification.

The embodiments of this application are described above with reference to the accompanying drawings, but the present invention is not limited to the foregoing specific embodiments, which are merely illustrative rather than limited. Under the inspiration of the present invention, a person of ordinary skill in the art can make many forms without departing from the scope of the present invention and the protection of the claims, all of which fall within the protection of this application.

What is claimed is:

1. An application sharing method, applicable to a first electronic device, the method comprising:
   receiving target application identification information and target device information;
   starting, in a case that the first electronic device is connected to a target electronic device corresponding to the target device information, a running interface of a target application corresponding to the target application identification information in a virtual screen, wherein the virtual screen is started in a background of the first electronic device; and
   sharing the running interface of the target application displayed in the virtual screen with the target electronic device.

2. The method according to claim 1, wherein the receiving target application identification information comprises:
   receiving a first operation;
   displaying identification information of at least one first application in response to the first operation; and
   receiving a first selection operation for the target application identification information in the identification information of the at least one first application to obtain the target application identification information.

3. The method according to claim 2, wherein the receiving a first operation comprises:
   receiving a second operation on the first electronic device;

displaying a control window in response to the second operation, wherein the control window comprises an application sharing control; and receiving a third operation for the application sharing control.

4. The method according to claim 3, wherein after the displaying a control window, the method further comprises: updating a name of the application sharing control based on a name of the target application, wherein an updated name of the application sharing control is displayed in the control window.

5. An electronic device, comprising a memory and a processor, the memory storing a computer program, the processor, when executing the computer program, implementing the following steps:

receiving target application identification information and target device information;

starting, in a case that the first electronic device is connected to a target electronic device corresponding to the target device information, a running interface of a target application corresponding to the target application identification information in a virtual screen, wherein the virtual screen is started in a background of the first electronic device; and sharing the running interface of the target application displayed in the virtual screen with the target electronic device.

6. The electronic device according to claim 5, wherein the processor, when executing the computer program, further implements the following steps:

receiving a first operation;

displaying identification information of at least one first application in response to the first operation; and receiving a first selection operation for the target application identification information in the identification information of the at least one first application to obtain the target application identification information.

7. The electronic device according to claim 6, wherein the processor, when executing the computer program, further implements the following steps:

receiving a second operation on the first electronic device;

displaying a control window in response to the second operation, wherein the control window comprises an application sharing control; and receiving a third operation for the application sharing control.

8. The electronic device according to claim 7, wherein the processor, when executing the computer program, further implements the following steps: updating a name of the application sharing control based on a name of the target application, wherein an updated name of the application sharing control is displayed in the control window.

9. A non-transitory computer-readable storage medium, storing a computer program, wherein the computer program, when executed by a processor, implements the following steps:

receiving target application identification information and target device information;

starting, in a case that the first electronic device is connected to a target electronic device corresponding to the target device information, a running interface of a target application corresponding to the target application identification information in a virtual screen, wherein the virtual screen is started in a background of the first electronic device; and sharing the running interface of the target application displayed in the virtual screen with the target electronic device.

10. The non-transitory computer-readable storage medium according to claim 9, wherein the computer program, when executed by the processor, further implements the following steps:

receiving a first operation;

displaying identification information of at least one first application in response to the first operation; and receiving a first selection operation for the target application identification information in the identification information of the at least one first application to obtain the target application identification information.

11. The non-transitory computer-readable storage medium according to claim 10, wherein the computer program, when executed by the processor, further implements the following steps:

receiving a second operation on the first electronic device;

displaying a control window in response to the second operation, wherein the control window comprises an application sharing control; and receiving a third operation for the application sharing control.

12. The non-transitory computer-readable storage medium according to claim 11, wherein the computer program, when executed by the processor, further implements the following steps: updating a name of the application sharing control based on a name of the target application, wherein an updated name of the application sharing control is displayed in the control window.

* * * * *